US008818441B2

(12) United States Patent
Haim et al.

(10) Patent No.: US 8,818,441 B2
(45) Date of Patent: Aug. 26, 2014

(54) METHOD AND APPARATUS FOR CONTROLLING TRANSMIT POWER OF TRANSMISSIONS ON MORE THAN ONE COMPONENT CARRIER

(75) Inventors: John W. Haim, Baldwin, NY (US); Janet A. Stern-Berkowitz, Little Neck, NY (US); Sung-Hyuk Shin, Northvale, NJ (US); Pascal M. Adjakple, Great Neck, NY (US); Chang-Soo Koo, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 686 days.

(21) Appl. No.: 12/896,658

(22) Filed: Oct. 1, 2010

(65) Prior Publication Data

US 2011/0081936 A1  Apr. 7, 2011

Related U.S. Application Data

(60) Provisional application No. 61/248,298, filed on Oct. 2, 2009, provisional application No. 61/295,035, filed on Jan. 14, 2010, provisional application No. 61/373,293, filed on Aug. 13, 2010.

(51) Int. Cl.
*H04W 52/34* (2009.01)
(52) U.S. Cl.
USPC .......................................... 455/522; 370/318
(58) Field of Classification Search
CPC ....... H04W 52/34; H04W 52/146; H04Q 7/20
USPC .......................................... 455/522; 370/318
See application file for complete search history.

(56) References Cited

U.S. PATENT DOCUMENTS

| 8,447,343 | B2* | 5/2013 | Gerstenberger et al. | ....... 455/522 |
|---|---|---|---|---|
| 8,625,405 | B2* | 1/2014 | Dinan | ........... 370/206 |
| 8,644,129 | B2* | 2/2014 | Dinan | ........... 370/206 |
| 2006/0003787 | A1 | 1/2006 | Heo et al. | |
| 2007/0010269 | A1 | 1/2007 | Azuma | |
| 2010/0061480 | A1 | 3/2010 | Kashiwase et al. | |
| 2010/0197339 | A1* | 8/2010 | Pedersen et al. | ............. 455/522 |
| 2012/0113831 | A1* | 5/2012 | Pelletier et al. | ............... 370/252 |
| 2012/0113962 | A1* | 5/2012 | Jen | ................. 370/336 |
| 2012/0178494 | A1* | 7/2012 | Haim et al. | ................... 455/522 |
| 2012/0182949 | A1* | 7/2012 | Aiba et al. | .................... 370/329 |
| 2012/0188947 | A1* | 7/2012 | Larsson et al. | ............... 370/328 |
| 2012/0213154 | A1* | 8/2012 | Gaal et al. | ..................... 370/328 |
| 2012/0243514 | A1* | 9/2012 | Wu | ................. 370/336 |
| 2012/0263060 | A1* | 10/2012 | Suzuki et al. | ................. 370/252 |
| 2012/0300715 | A1* | 11/2012 | Pelletier et al. | ............... 370/329 |

(Continued)

OTHER PUBLICATIONS

MCC Support, "Final Report of 3GPP TSG RAN WG1 #60bis v1.0.0 (Beijing, China, Apr. 12-16, 2010)," 3GPP TSG RAN Meeting #61, Montreal, Canada (May 10-14, 2010).

(Continued)

*Primary Examiner* — Bobbak Safaipour
(74) *Attorney, Agent, or Firm* — Volpe and Koenig, P.C.

(57) ABSTRACT

A method and apparatus for controlling or determining transmit power of transmissions on more than one component carrier (CC) is disclosed. A WTRU may set a transmit power for each of a plurality of channels mapped to multiple CCs. The channels may include at least one physical uplink shared channel (PUSCH) and may also include at least one physical uplink control channel (PUCCH).

18 Claims, 6 Drawing Sheets

(56) References Cited

U.S. PATENT DOCUMENTS

| | | | | |
|---|---|---|---|---|
| 2012/0314666 | A1* | 12/2012 | Pedersen et al. | 370/329 |
| 2013/0016696 | A1* | 1/2013 | Adjakple et al. | 370/331 |
| 2013/0034069 | A1* | 2/2013 | Uemura | 370/329 |
| 2013/0044709 | A1* | 2/2013 | Adjakple et al. | 370/329 |
| 2013/0058315 | A1* | 3/2013 | Feuersanger et al. | 370/336 |
| 2013/0114472 | A1* | 5/2013 | Tamaki et al. | 370/280 |
| 2014/0010182 | A1* | 1/2014 | Chunli et al. | 370/329 |

OTHER PUBLICATIONS

MCC Support, "Final Report of 3GPP TSG RAN WG1 #61 v3.0.0 (Montreal, Canada, May 10-14, 2010)," 3GPP TSG RAN WG1 Meeting #61bis, Dresden, Germany (Jun. 28-Jul. 2, 2010).

RAN WG1, "Way Forward on UL Power Control With Carrier Aggregation," 3GPP TSG RAN WG1 #60bis, Beijing, China (Apr. 12-16, 2010).

Research in Motion UK Limited, "Uplink Power Control for Carrier Aggregation," 3GPP TSG RAN WG1 Meeting #58, Shenzhen, China (Aug. 24-28, 2009).

Third Generation Partnership Project, "Technical Specification Group Radio Access Network; Evolved Universal Terrestrial Radio Access (E-UTRA); Physical Layer Procedures (Release 8)," 3GPP TS 36.213 v8.8.0 (Sep. 2009).

Third Generation Partnership Project, "Technical Specification Group Radio Access Network; Evolved Universal Terrestrial Radio Access (E-UTRA); Physical Layer Procedures (Release 9)," 3GPP TS 36.213 v9.2.0 (Jun. 2010).

Third Generation Partnership Project, "Technical Specification Group Radio Access Network; Evolved Universal Terrestrial Radio Access (E-UTRA); User Equipment (UE) Radio Transmission and Reception (Release 8)," 3GPP TS 36.101 v8.7.0 (Sep. 2009).

Third Generation Partnership Project, "Technical Specification Group Radio Access Network; Evolved Universal Terrestrial Radio Access (E-UTRA); User Equipment (UE) Radio Transmission and Reception (Release 8)," 3GPP TS 36.101 v8.10.0 (Jun. 2010).

Third Generation Partnership Project, "Technical Specification Group Radio Access Network; Evolved Universal Terrestrial Radio Access (E-UTRA); User Equipment (UE) Radio Transmission and Reception (Release 9)," 3GPP TS 36.101 v9.1.0 (Sep. 2009).

Third Generation Partnership Project, "Technical Specification Group Radio Access Network; Evolved Universal Terrestrial Radio Access (E-UTRA); User Equipment (UE) Radio Transmission and Reception (Release 9)," 3GPP TS 36.101 v9.4.0 (Jun. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 v8.10.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 v8.12.0 (Mar. 1020).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)," 3GPP TS 36.300 v9.1.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 9)," 3GPP TS 36.300 v9.4.0 (Jun. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 10),"3GPP TS 36.300 v10.0.0 (Jun. 2010).

Nokia Siemens Networks et al., "Uplink Power Control for LTE-Advanced," 3GPP TSG RAN WG1 #58 Meeting, R1-093322 (Aug. 24-28, 2009).

Samsung, "UL Transmission Power Control in LTE-A," 3GPP TSG RAN WG1 #58, R1-093395 (Aug. 24-28, 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," 3GPP TS 36.300 v8.12.0 (Mar. 2010).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)," 3GPP TS 36.300 v10.0.0 (Jun. 2010).

Alcatel-Lucent et al., "Clarification on power scaling," 3GPP TSG-RAN WG1 #63, R1-105985, Jacksonville, Florida, USA (Nov. 15-19, 2010).

Nokia Siemens Networks, "Summary of offline discussion on UL PC," 3GPP TSG RAN WG1 #59bis Meeting, R1-100815, Valencia, Spain (Jan. 18-22, 2010).

* cited by examiner

METHOD AND APPARATUS FOR CONTROLLING TRANSMIT POWER OF TRANSMISSIONS ON MORE THAN ONE COMPONENT CARRIER

CROSS REFERENCE TO RELATED APPLICATIONS

This application claims the benefit of U.S. provisional application No. 61/248,298 filed Oct. 2, 2009, U.S. provisional application No. 61/295,035 filed Jan. 14, 2010, and U.S. provisional application No. 61/373,293 filed Aug. 13, 2010, the contents of which are hereby incorporated by reference herein.

BACKGROUND

In Long Term Evolution (LTE), single carrier frequency division multiple access (SC-FDMA) transmission may be selected for the uplink (UL) direction such as by using discrete fourier transform spread orthogonal frequency division multiplexing (DFTS-OFDM). A LTE wireless transmit/receive unit (WTRU) in the UL may transmit a limited, contiguous set of assigned sub-carriers with Frequency Division Multiple Access (FDMA). For example, if the overall orthogonal frequency division multiplex (OFDM) signal or system bandwidth in the UL includes useful sub-carriers numbered 1 to 100, a first WTRU may be assigned to transmit its own signal on sub-carriers 1-12, a second WTRU may transmit on sub-carriers 13-24, and so on. An evolved NodeB (eNodeB) may receive the composite UL signal across the entire transmission bandwidth from one or more WTRUs at the same time, but each WTRU may transmit on a subset of the available transmission bandwidth.

Transmit power of a WTRU may be determined in the WTRU based on measurements made by the WTRU and control data received from the eNodeB. WTRU transmit power control may be needed for maintaining quality of service (QoS), controlling inter-cell interference, and managing a terminal's battery life. LTE advanced (LTE-A), includes features such as bandwidth extension using carrier aggregation, UL multiple-input multiple-output (MIMO), and simultaneous physical uplink shared channel (PUSCH) and physical uplink control channel (PUCCH) transmissions, that may impact WTRU transmit power control.

It is desirable for uplink power control in LTE to compensate for long-term fading, such as pathloss or shadowing, while reducing inter-cell interference and avoiding occurrences of the WTRU using a maximum power procedure to prevent its power amplifier (PA) from operating beyond its linear region and/or to prevent the WTRU from exceeding maximum transmit power limits that may be imposed by the network, regulatory requirements, or the like. Transmit power for LTE uplink may be determined using open loop and closed loop power control that may be predicated on the WTRU transmitting on one component carrier (CC) with one antenna/power amplifier combination. LTE-advanced (LTE-A) includes bandwidth extension using carrier aggregation, where the WTRU may transmit simultaneously on multiple component carriers (CCs). It is desirable to provide ways for determining transmit power when using multiple CCs such that the PAs of the WTRU operates within limits.

SUMMARY

A method and apparatus for controlling or determining transmit power of transmissions on more than one component carrier (CC) is disclosed. A WTRU may set a transmit power for each of a plurality of channels mapped to multiple CCs. The channels may include at least one physical uplink shared channel (PUSCH) and may also include at least one physical uplink control channel (PUCCH).

BRIEF DESCRIPTION OF THE DRAWINGS

A more detailed understanding may be had from the following description, given by way of example in conjunction with the accompanying drawings wherein.

DETAILED DESCRIPTION

Figure 1A:
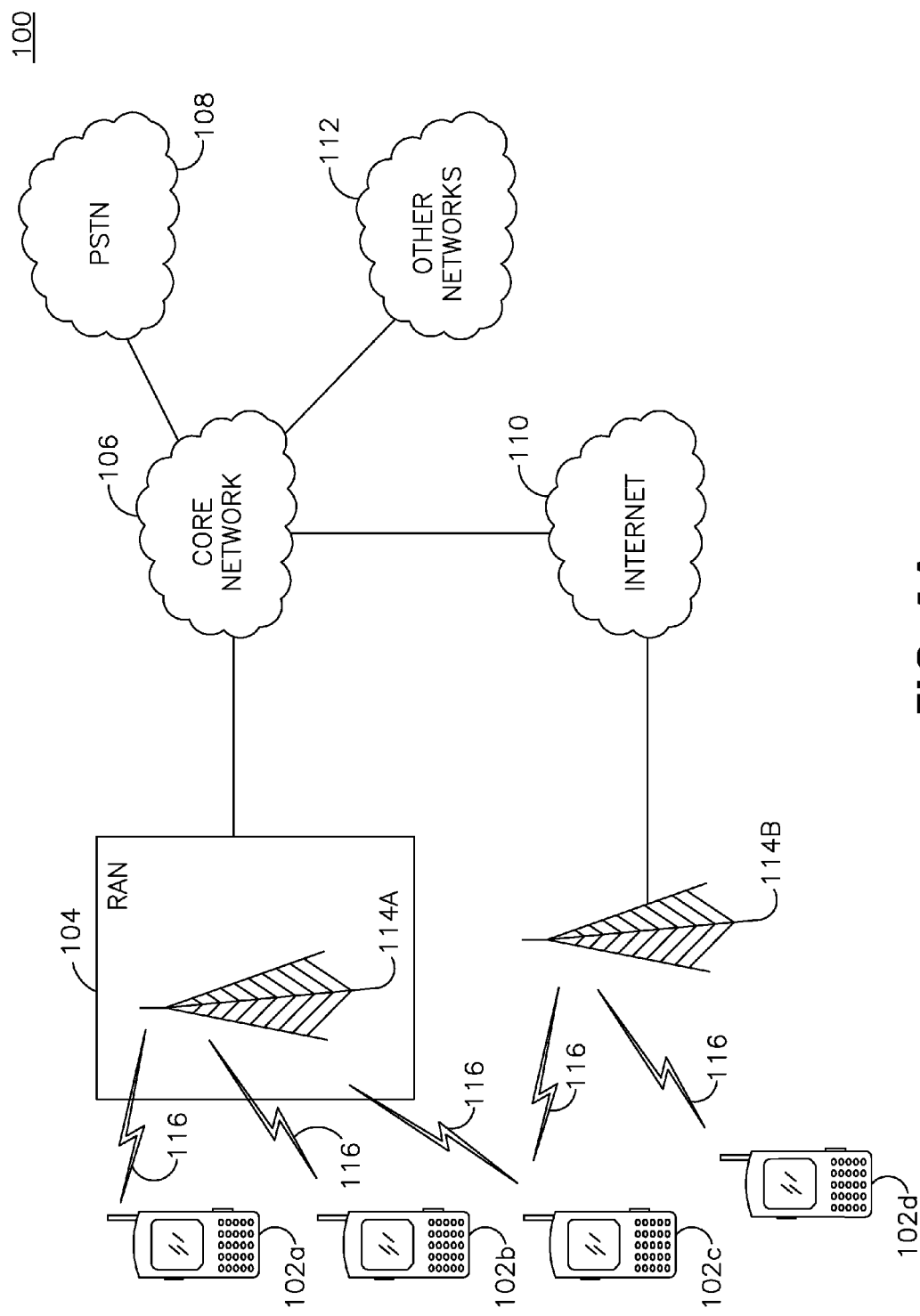
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, or 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, or 102d may be any type of device configured to operate and/or communicate in a wireless environment. By way of example, WTRUs 102a, 102b, 102c, or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a or 114b may be any type of device configured to wirelessly interface with at least one of the WTRUs 102a, 102b, 102c, or 102d to facilitate access to one or more communication networks, such as the core network 106, the Internet 110, and/or the networks 112. By way of example, the base stations 114a or 114b may be a base transceiver station (BTS), a NodeB, an eNodeB, a Home NodeB, a Home eNodeB, a site controller, an access point (AP), a wireless router, and the like. While the base stations 114a or 114b are each depicted as a single element, it will be appreciated that the base stations 114a or 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

Base stations 114a or 114b may communicate with one or more of the WTRUs 102a, 102b, 102c or 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, or the like. For example, the base station 114a in the RAN 104 and the WTRUs 102a, 102b, or 102c may implement a radio technology such as Universal Mobile Telecommunications System (UMTS) Terrestrial Radio Access (UTRA), which may establish the air interface 116 using wideband CDMA (W-CDMA). W-CDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, or 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, or 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), or the like.

The base station 114b in FIG. 1A may be a wireless router, Home NodeB, Home eNodeB, or access point, for example, and may utilize any suitable RAT for facilitating wireless connectivity in a localized area, such as a place of business, a home, a vehicle, a campus, or the like. In one embodiment, the base station 114b and the WTRUs 102c or 102d may implement a radio technology such as IEEE 802.11 to establish a wireless local area network (WLAN). In another embodiment, the base station 114b and the WTRUs 102c or 102d may implement a radio technology such as IEEE 802.15 to establish a wireless personal area network (WPAN). In yet another embodiment, the base station 114b and the WTRUs 102c or 102d may utilize a cellular-based RAT (e.g., W-CDMA, CDMA2000, GSM, LTE, LTE-A, etc.) to establish a picocell or femtocell. As shown in FIG. 1A, the base station 114b may have a direct connection to the Internet 110. Thus, the base station 114b may not be needed to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, or 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, or 102d in the communications system 100 may include multi-mode capabilities, i.e., the WTRUs 102a, 102b, 102c, or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
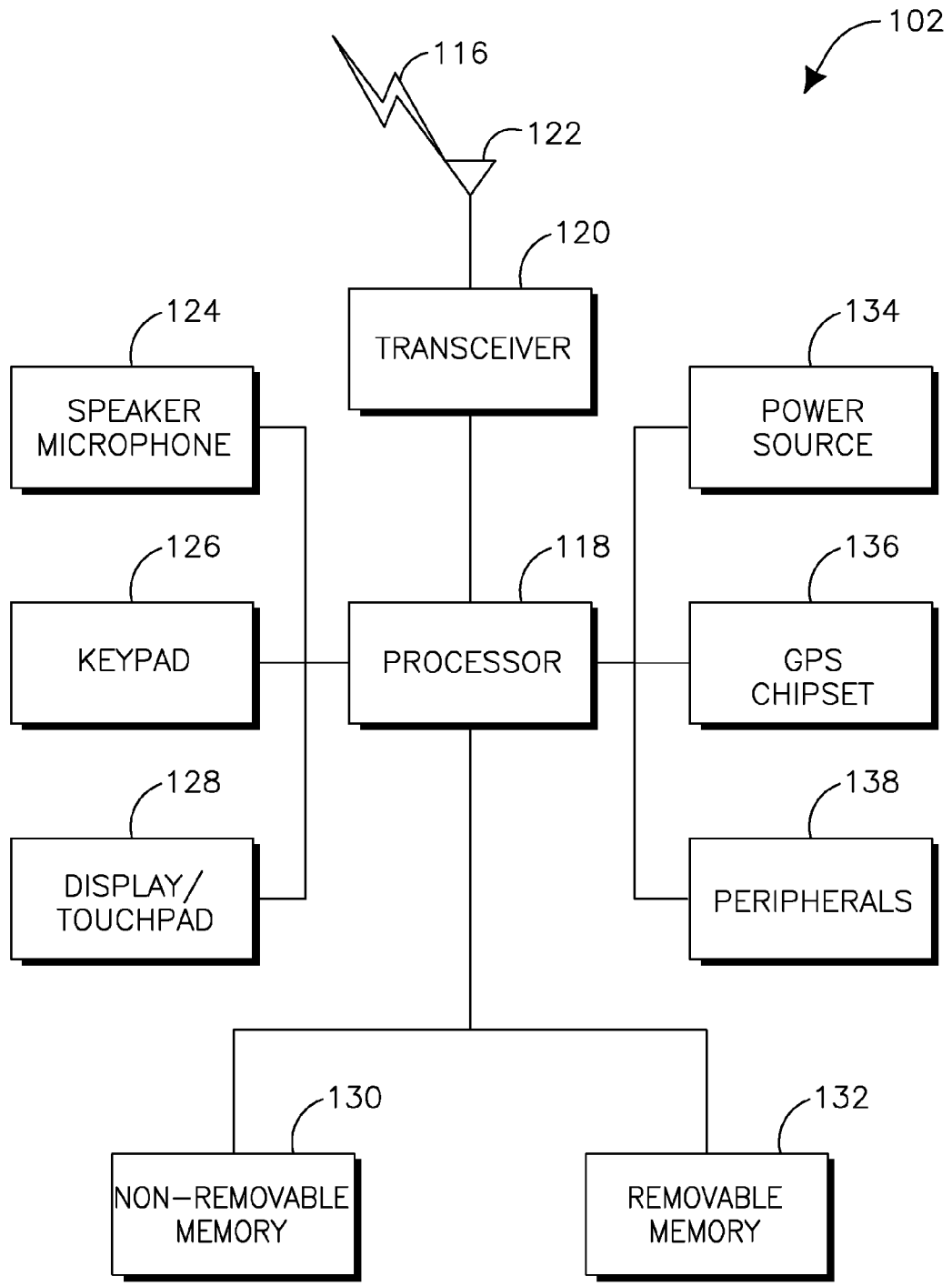
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ multiple-input/multiple-output (MIMO) technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, or the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a* or 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
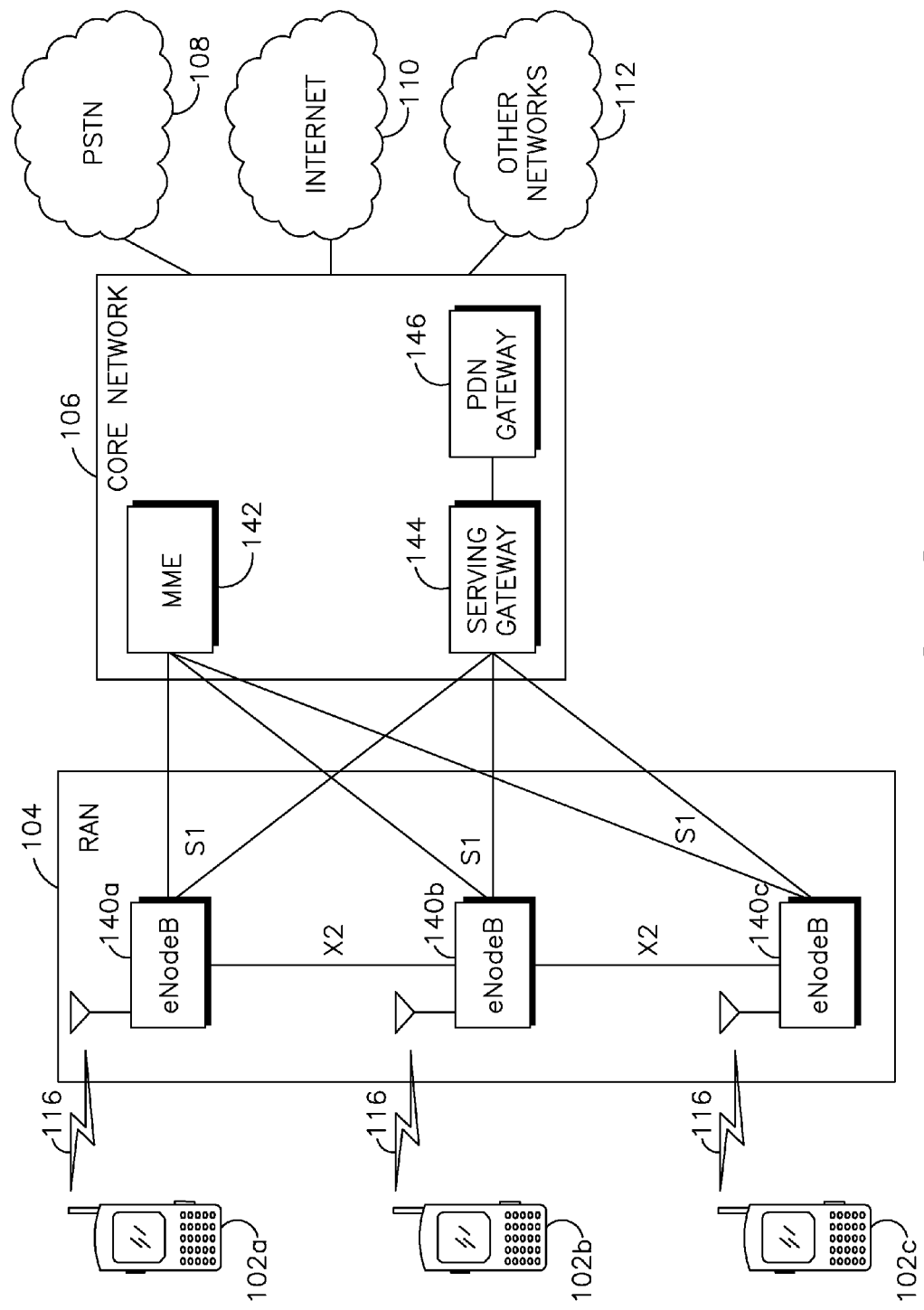
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, or 102*c* over the air interface 116, though it will be appreciated that the disclosed embodiments may have any number of WTRUs, base stations, networks, or network elements. The RAN 104 may also be in communication with the core network 106.

The RAN 104 may include eNodeBs 140*a*, 140*b*, or 140*c*, though it will be appreciated that the RAN 104 may include any number of eNodeBs while remaining consistent with an embodiment. The eNodeBs 140*a*, 140*b*, or 140*c* may each include one or more transceivers for communicating with the WTRUs 102*a*, 102*b*, or 102*c* over the air interface 116. In one embodiment, the eNodeBs 140*a*, 140*b*, or 140*c* may implement MIMO technology. Thus, the eNodeB 140*a*, for example, may use multiple antennas to transmit wireless signals to, and receive wireless signals from, the WTRU 102*a*.

Each of the eNodeBs 140*a*, 140*b*, or 140*c* may be associated with a particular cell (not shown) and may be configured to handle radio resource management decisions, handover decisions, scheduling of users in the uplink and/or downlink, and the like. As shown in FIG. 1C, the eNodeBs 140*a*, 140*b*, or 140*c* may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

In addition to the components that may be found in a typical eNodeB, eNodeBs 140*a*, 140*b*, or 140*c* includes a processor with an optional linked memory, transceivers, and antennas. The processor may be configured to perform a method of supporting carrier aggregation of multiple component carriers. eNodeB, eNodeBs 140*a*, 140*b*, or 140*c* are connected to MME 142 which includes a processor with an optional linked memory.

The MME 142 may be connected to each of the eNodeBs 142*a*, 142*b*, or 142*c* in the RAN 104 via an S1 interface and may serve as a control node. For example, the MME 142 may be responsible for authenticating users of the WTRUs 102a, 102b, or 102c, bearer activation/deactivation, selecting a particular serving gateway during an initial attach of the WTRUs 102a, 102b, or 102c, and the like. The MME 142 may also provide a control plane function for switching between the RAN 104 and other RANs (not shown) that employ other radio technologies, such as GSM or WCDMA.

The serving gateway 144 may be connected to each of the eNodeBs 140a, 140b, or 140c in the RAN 104 via the S1 interface. The serving gateway 144 may generally route and forward user data packets to/from the WTRUs 102a, 102b, or 102c. The serving gateway 144 may also perform other functions, such as anchoring user planes during inter-eNodeB handovers, triggering paging when downlink data is available for the WTRUs 102a, 102b, or 102c, managing and storing contexts of the WTRUs 102a, 102b, or 102c, or the like.

The serving gateway 144 may also be connected to the PDN gateway 146, which may provide the WTRUs 102a, 102b, or 102c with access to packet-switched networks, such as the Internet 110, to facilitate communications between the WTRUs 102a, 102b, or 102c and IP-enabled devices.

The core network 106 may facilitate communications with other networks. For example, the core network 106 may provide the WTRUs 102a, 102b, or 102c with access to circuit-switched networks, such as the PSTN 108, to facilitate communications between the WTRUs 102a, 102b, or 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, or 102c with access to the networks 112, which may include other wired or wireless networks that are owned and/or operated by other service providers.

In the examples forthcoming, uplink transmit power control procedures are given. However, the same procedures and embodiments may apply for transmitting downlink information, especially for home NodeB, home eNodeB, and femto-cell applications. Also, any combination of the disclosed features/elements may be used in one or more embodiments.

For uplink transmit power control, for instance over the physical uplink shared channel (PUSCH), WTRU transmit power $P_{PUSCH}$ for one component carrier (CC) may be defined as follows:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\}, \quad \text{Equation (1)}$$

where $P_{CMAX}$ may be the configured maximum WTRU transmission power for the CC (which may take into account one or more of a signaled maximum power value for the CC, the maximum power of a WTRU power class, maximum power reduction allowances, tolerances, and the like), $M_{PUSCH}(i)$ may be the bandwidth of the PUSCH resource assignment expressed in number of resource blocks scheduled for subframe i, $P_{O\_PUSCH}(j)$ may be a parameter including the sum of a cell-specific nominal component and a WTRU-specific component provided by higher layers. The j parameter may be related to an UL transmission model. For example, j=0 for PUSCH transmissions corresponding to a semi-persistent grant, j=1 for PUSCH transmissions corresponding to a dynamic scheduled grant, and j=2 for PUSCH transmissions corresponding to the random access response. Moreover, PL may be the downlink path loss estimate calculated at a WTRU in decibels (dBs), $\Delta_{TF}(i)$ may be the offset with respect to the transport format, and f(i) may be the power control adjustment.

Figure 2:
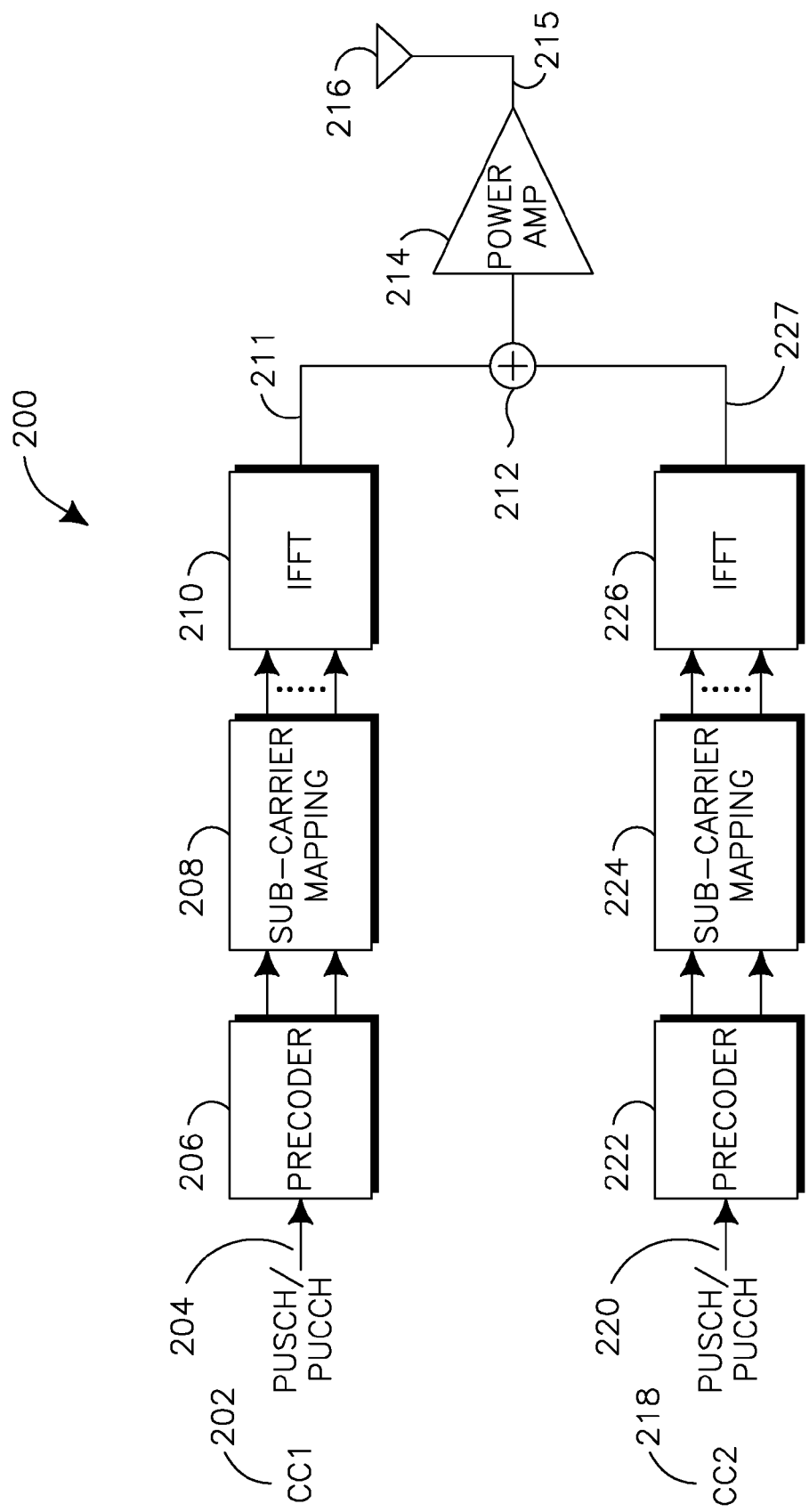
FIG. 2 shows an example of carrier aggregation in the uplink, having two component carriers (CCs) sharing a power amplifier (PA)

For the case of one CC per power amplifier (PA), Equation (1) for transmit power suffices. However, with multiple CCs and potentially multiple PAs, modifications may be needed because of WTRU, PA, or CC limitations. One approach may be to use a common PA for more than one CC, as shown in FIG. 2 for the case of 2 CCs sharing one PA in WTRU 200. Although 2 CCs and one PA are shown in FIG. 2, WTRU 200 may be configured with any combination or number of CCs and PAs.

Component carrier 1 (CC1) 202 may be used to transmit uplink information 204 over the PUSCH or physical uplink control channel (PUCCH). Information 204 may be precoded with precoder 206, mapped to subcarriers with block 208, and inverse fast fourier transformed with block 210. WTRU 200 may have some or all of the components given in WTRU 102.

Still referring to FIG. 2, component carrier 2 (CC2) 218 may be used to transmit uplink information 220 over the PUSCH or PUCCH. Information 220 may be precoded with precoder 222, mapped to subcarriers with block 224, and inverse fast fourier transformed with block 226. Processed information signals 211 and 227 may be combined or multiplexed at 212 to share PA 214. Signals 215 coming from PA 214 are transmitted with antenna 216. It may be desirable to limit, to some maximum, the power difference between the two or more CCs, such as 202 and 218, to possibly limit the dynamic range of the baseband digital circuitry and/or PA 214. Although FIG. 2 shows the possibility of transmitting PUCCH on both CC1 and CC2, transmission of PUCCH may only be possible on one of the CCs, for example a primary CC, as may be the case for LTE-A.

By way of example, the forth coming embodiments are described with reference to the components of WTRU 200 of FIG. 2, however, other components and devices may be used to implement these embodiments.

Embodiments for power control for PUCCH and PUSCH in LTE-A are disclosed. Even though embodiments may be described in reference to LTE-A, the embodiments are applicable to any other system using packetized, OFDM or OFDM-like air interface technologies. The transmit power processing described herein may be handled by the medium access control (MAC), physical layer (PHY), or a combination of MAC and PHY with supporting MAC or PHY configurations performed by WTRU higher layers. In the examples forthcoming, although in some configurations two component carriers sharing a PA is discussed, a plurality of CCs may share one or more PAs.

WTRU 200 may set transmit power without consideration for a maximum CC power difference, WTRU 200 may autonomously limit the CC power difference, WTRU 200 may signal the maximum CC power difference, and maximum CC power difference may be specified in a WTRU or signaled to a WTRU by the network, for example by an eNodeB. WTRU 200 may also perform CC transmit power limitation after limiting the power difference between CCs such as 202 and 218. WTRU 200 may also perform maximum PA transmit power limitations after limiting the power difference between CCs such as 202 and 218.

Additionally, RAN 104 or network 106 may adjust target Signal to Interference Ratios (SIRs) at eNodeBs 140, WTRU 200 may detect power imbalances and notify RAN 104 or network 106, and total transmission power-based handling may be used for power imbalances.

Figure 3:
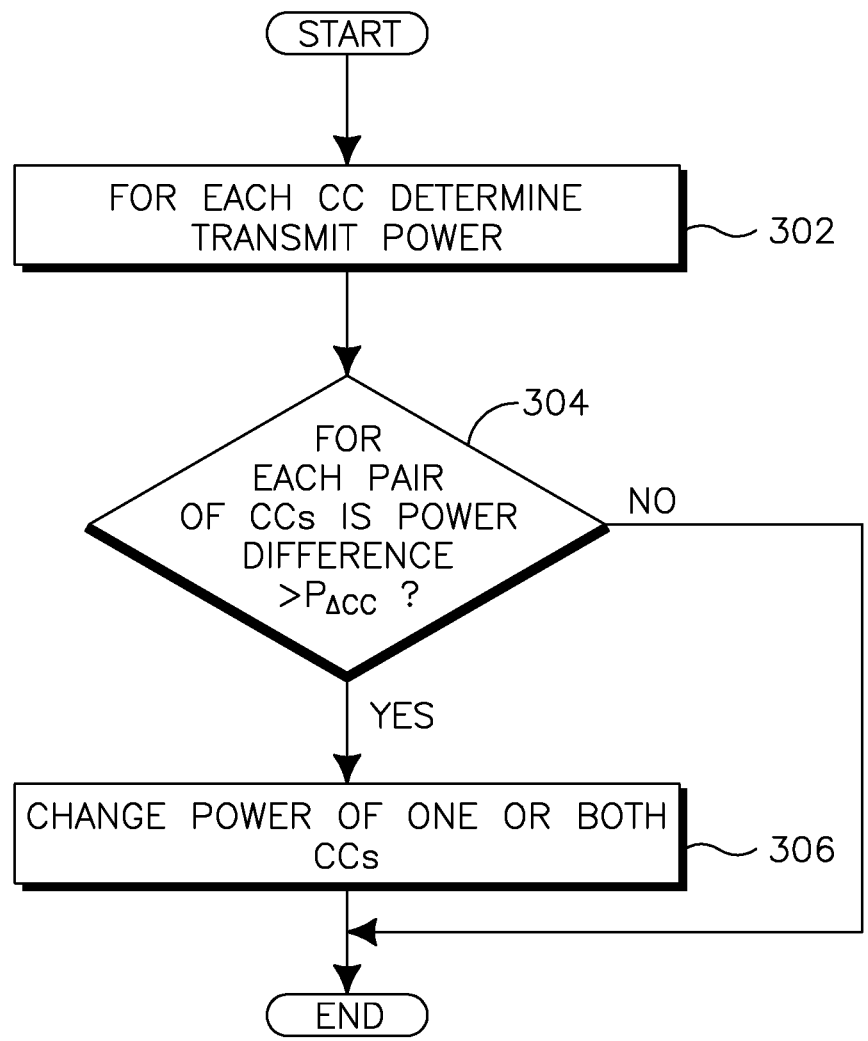
FIG. 3 is diagram of an example process of performing transmit power control in a multiple component carrier WTRU.

FIG. 3 is diagram of an example process for performing transmit power control in a multiple component carrier WTRU. For each CC, a WTRU determines transmit power (302). A WTRU transmitting over multiple component carriers may determine transmit power for the current subframe in view of any limitations that it may have. Example limitations may be maximum transmit power on a CC and maximum transmit power for the combination of the transmit powers of the CCs. These limitations may be due to the capabilities of the WTRU implementation, imposed by the network, caused by interference, etc.

For each pair of CCs a WTRU may determine if the power difference between CCs is greater than $P_{ACC}$, the allowed maximum power difference between CCs (304). If the power difference between CCs is greater, then the power of one or both CCs may be changed prior to transmitting a subframe (306). If it is not greater, the power level of the CCs is not changed.

The WTRU may determine a transmit power for each component carrier to be used in the current subframe independently or jointly to account for any limitations and a maximum transmit delta value. The WTRU may then adjust power levels of each carrier independently or jointly based on channel priorities or power differences between PUCCHs, PUSCHs, or component carriers as an example.

Figure 4:
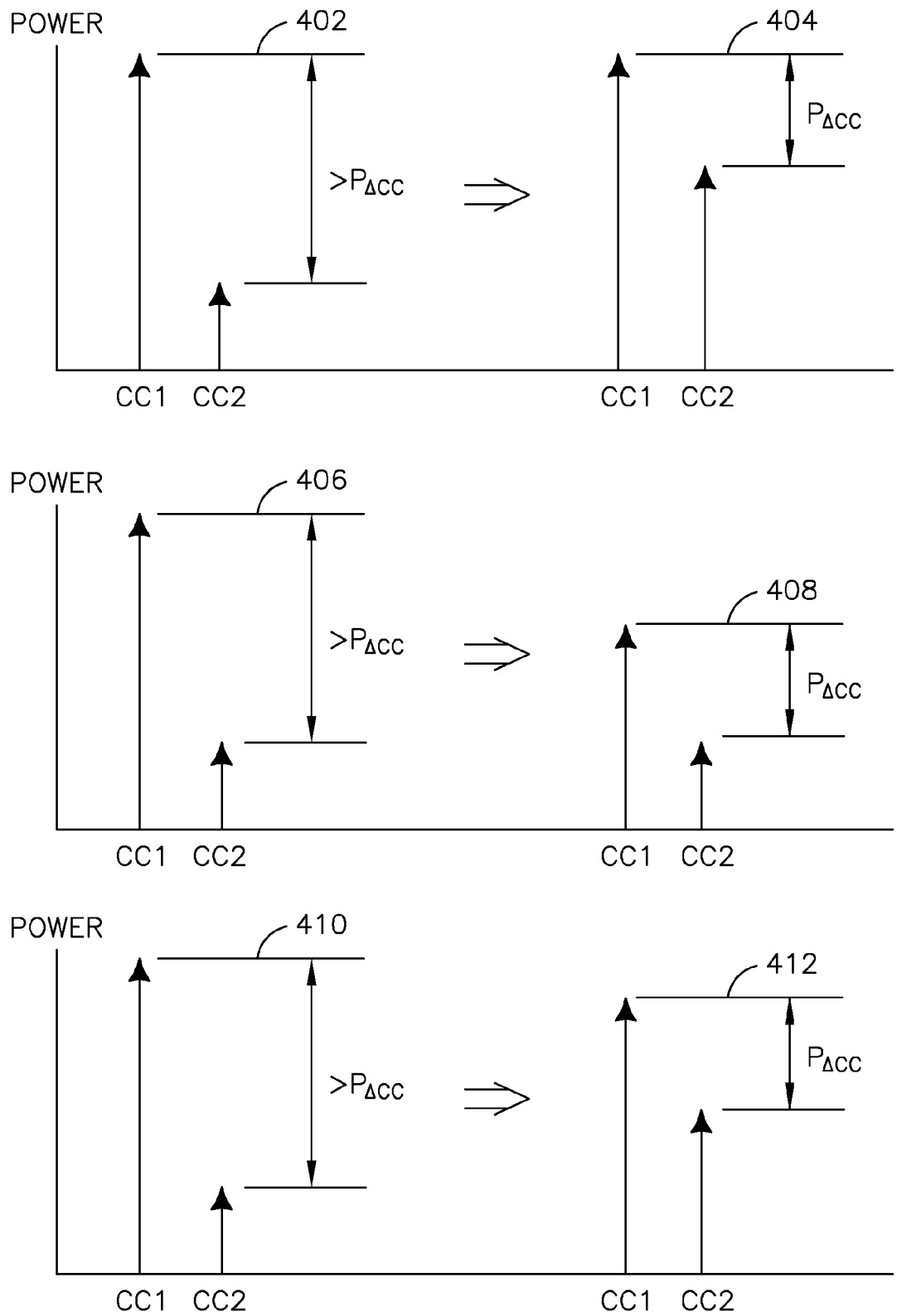
FIG. 4 is a diagram showing transmit power level adjustments in accordance with different embodiments.

FIG. 4 is a diagram showing transmit power level adjustments in accordance with different embodiments. If the power difference between CC1 and CC2 is greater than the allowed maximum power difference between CCs, $P_{ACC}$ 402, the transmit power level of CC2 may be raised resulting in a reduced transmit power difference equal to $P_{ACC}$ 404 or less. If the power difference between CC1 and CC2 is greater than $P_{ACC}$ 406, the allowed maximum power difference between CCs, the transmit power level of CC1 may be lowered resulting in a reduced transmit power difference equal to $P_{ACC}$ 408 or less. If the power difference between CC1 and CC2 is greater than $P_{ACC}$ 410, the allowed maximum power difference between CCs, the transmit power level of CC1 may be lowered and the transmit power level of CC2 may be raised resulting in a reduced transmit power difference equal to $P_{ACC}$ 412 or less.

In one embodiment, a WTRU may set transmit power without consideration of a maximum CC power differences. For the case of K component carriers sharing one PA, a method for setting WTRU transmit power $P_{Tx}$ (i) (power transmitted by one PA in subframe i) may be as follows:

$$P_{Tx}(i) = 10\log_{10}\left(\min\left\{10^{\frac{P_{AMAX}}{10}}, \sum_k 10^{\frac{P_{PUSCH}(i,k)}{10}}\right\}\right); \quad \text{Equation (2)}$$

$$P_{PUSCH}(i,k) = \quad \text{Equation (3)}$$
$$\min\{P_{EMAX}, 10\log_{10}(M_{PUSCH}(i,k)) + P_{O\_PUSCH}(j) + \alpha(j) \cdot PL + \Delta_{TF}(i) + f(i)\},$$

where k may be the k-th CC sharing a PA and $M_{PUSCH}(i,k)$ may be the bandwidth of the PUSCH resource assignment expressed in number of resource blocks scheduled for CC k in subframe i, $P_{O\_PUSCH}(j)$ may be a parameter including the sum of a cell-specific nominal component and a WTRU specific component provided by higher layers, $\alpha(j)$ may be a cell-specific parameter provided by higher layers, PL may be the downlink pathloss estimate calculated at a WTRU, $\Delta_{TF}(i)$ may be the offset with respect to the transport format, and f(i) may be a power control adjustment function. The individual parameters of $P_{O\_PUSCH}(j)$, $\alpha(j)$, PL, $\Delta_{TF}(i)$, and f(i) may also be CC-specific. $P_{EMAX}$ may be the configured maximum WTRU transmission power for a CC ($P_{EMAX}$ may be CC specific such as defining $P_{EMAX}(k)$ as the configured maximum WTRU transmit power for the k-th CC, or alternatively, $P_{EMAX}$ may be common to all configured uplink (UL) CCs), and $P_{AMAX}$ may be the maximum transmission power for a PA, possibly reduced by maximum power reduction (MPR).

$P_{EMAX}$ and $P_{AMAX}$ may represent two power limits. The maximum power, $P_{EMAX}$, is the maximum that may be transmitted by any WTRU in a given CC to control inter-cell interference. This may be configured by an eNodeB and signaled to a WTRU through higher layers (for example, system information blocks (SIBs), master information blocks (MIBs), or radio resource control (RRC) signaling). $P_{EMAX}$ may be cell specific, CC specific, WTRU specific, service specific, or based on a combination of cell, CC, WTRU, and service specific.

$P_{AMAX}$, the maximum power that may be transmitted by a PA may be a predefined parameter specified in a WTRU, which may be a function of its capabilities, such as power class. $P_{AMAX}$ may be used to restrain the PA to its linear operating region. If a WTRU has multiple PAs, then there is a possibility that the value of $P_{AMAX}$ may be different for each PA. Alternatively, the maximum power may be defined based on the total transmit power, independent of the number of PAs.

For the case of simultaneous PUSCH and PUCCH, the PUCCH transmit power may be included in equation (2) as follows:

$$P_{Tx}(i) = \min\left\{P_{AMAX}, \sum_k (P_{PUSCH}(i,k) + P_{PUCCH}(i,k))\right\}; \quad \text{Equation (4)}$$

$$P_{PUCCH}(i,k) = \min\{P_{EMAX}, \quad \text{Equation (5)}$$
$$P_{0\_PUCCH} + PL + h(n_{CQI}, n_{HARQ}) + \Delta_{F\_PUCCH}(F) + g(i)\},$$

where k may be the k-th CC in subframe i sharing a PA of interest, $P_{o\_PUCCH}$ may be a parameter including the sum of a cell-specific nominal component and a WTRU specific component provided by higher layers, PL may be the uplink pathloss estimate, $h(n_{CQI}, n_{HARQ})$ may be a PUCCH format-dependent value with $n_{CQI}$ corresponding to the number of information bits for the channel quality information and $n_{HARQ}$ is the number of HARQ bits, $\Delta_{F\_PUCCH}$ (F) corresponds to a PUCCH format (F) relative to PUCCH format 1a and may be provided by higher layers, and g(i) may be a power control adjustment function. The individual parameters may be CC-specific. The summation operation in equation (4) may be done in linear form and the resulting value may be converted back to decibel (dB) form.

In another embodiment, a WTRU may autonomously limit a CC power difference. It may be desirable, for example in an implementation of an architecture such as that shown in FIG. 2, to limit to some maximum level, the power difference between two or more CCs which may be carrying the PUSCH or PUCCH. This may limit the dynamic range of the baseband digital circuitry and/or PA or may limit the effect of the Adjacent Channel Leakage Ratio (ACLR) from a stronger CC onto a weaker CC. This entails the definition of a new parameter $P_{ACC}$, which may be specified for a given PA or for certain CCs or groups of CCs (e.g., CCs in the same band, contiguous CCs in the same band, etc.) or one value may be specified for a WTRU to use for all CCs, and additionally compute $P_{PUSCH}$ (and/or $P_{PUCCH}$). The result of the additional step may be to transmit a CC at a power level different from that determined as in equations (2) and (4), to meet the difference limit of $P_{ACC}$. Below, it may be assumed that PUSCH-only may be transmitted in subframe i, but it may be extended to the case of simultaneous PUSCH and PUCCH with the allowed maximum power difference between PUSCH and PUCCH possibly different from the allowed maximum power difference between CCs.

In a first method for this embodiment, for the case of K CCs with a power difference limit, for example K CCs mapped to a particular PA, the $P_{PUSCH}(i,k)$ (the transmit power for each CC k in subframe i) is computed first using equation (3) for PUSCH transmission. The maximum of these values may be then determined as follows:

$$P_1(i)=\max\{P_{PUSCH}(i,1), P_{PUSCH}(i,2)\ldots, P_{PUSCH}(i,K)\}. \qquad \text{Equation (6)}$$

$P_1(i)$ is an intermediate variable for a power level at subframe i. Next, the transmit power for each CC k in subframe i may be adjusted taking into account the power difference requirement as follows:

$$P_{PUSCH}(i,k)=\max\{P_{PUSCH}(i,k), P_1(i)-P_{\Delta CC}\}, \qquad \text{Equation (7)}$$

where $P_{\Delta CC}$ may be the maximum power difference (in dBs) between the CCs, with respect to the highest power CC.

For the case of $P_{EMAX}$ being the same for all CCs, there may be no possibility of a CC exceeding $P_{EMAX}$ as a result of the adjustment to ensure the CC power difference may not be exceeded. However, it is possible that a transmit power limit per CC may be defined, which would be different for one or more CCs. In this case, it is possible that increasing the power of a CC to meet the difference requirement of $P_{CC}$ could violate the maximum transmit power of a CC, $P_{EMAX}(k)$ and/or the maximum transmit power of a PA, $P_{AMAX}$.

For the case of simultaneous PUSCH and PUCCH, Equations (6) and (7) may be modified as follows where i is the subframe, k is the CC, k=1, 2, ... K, and K is the number of UL CCs:

$$P_1(i)=\max\{P_{PUSCH}(i,1)+P_{PUCCH}(i,1), P_{PUSCH}(i,2)+P_{PUCCH}(i,2)\ldots, P_{PUSCH}(i,K)+P_{PUCCH}(i,K)\}; \qquad \text{Equation (8)}$$

$$P_{PUSCH}(i,k)=\max\{P_{PUSCH}(i,k)+P_{PUCCH}(i,k), P_{\Delta CC} \cdot P_1(i)\}. \qquad \text{Equation (9)}$$

This may raise the power of weaker CCs which may reduce the power differences between CCs.

As previously noted, the transmit power for each CC k may be adjusted with respect to the highest power CC. Alternatively in a second method for this embodiment, the transmit power for each CC k may be adjusted with respect to the lowest power CC as follows. First, the minimum of these values may be determined as follows:

$$P_1(i)=\min\{P_{PUSCH}(i,1), P_{PUSCH}(i,2),\ldots, P_{PUSCH}(i,K)\}. \qquad \text{Equation (10)}$$

Next, the transmit power for each CC k in subframe i may be adjusted taking into account the power difference requirement as follows:

$$P_{PUSCH}(i,k)=\min\{P_{PUSCH}(i,k), P_1(i)+P_{\Delta CC}\}, \qquad \text{Equation (11)}$$

This may reduce the power of stronger CCs which may reduce the power differences between CCs.

Alternates may exist for equations 7 and 11 for this embodiment. For example, reducing the larger power by half of the excess difference, and increasing the lower power by half of the excess difference, or:

If $|P_{PUSCH}(i,k)-P_{PUSCH}(i,j)|>P_{\Delta CC}$ where k≠j, then
  If $P_{PUSCH}(i,k)>P_{PUSCH}(i,j)$, then $$P_{PUSCH}(i,k)=P_{PUSCH}(i,k)-(P_{PUSCH}(i,k)-P_{PUSCH}(i,j)-P_{\Delta CC})/2$$

$$P_{PUSCH}(i,j)=P_{PUSCH}(i,j)+(P_{PUSCH}(i,k)P_{PUSCH}(i,j)P_{\Delta CC})/2$$

Otherwise (that is, if $P_{PUSCH}(i,k)<P_{PUSCH}(i,j)$), $$P_{PUSCH}(i,j)P_{PUSCH}(i,j)-(P_{PUSCH}(i,j)-P_{PUSCH}(i,k)P_{\Delta CC})/2$$

$$P_{PUSCH}(i,k)=P_{PUSCH}(i,k)+(P_{PUSCH}(i,j)-P_{PUSCH}(i,k)-P_{\Delta CC})/2$$

More generally, a set of factors, α and β may be used to scale two CCs, for example:
If $|P_{PUSCH}(i,k)-P_{PUSCH}(i,j)|>P_{\Delta CC}$ where k≠j, then
  If $P_{PUSCH}(i,k)>P_{PUSCH}(i,j)$, then $$P_{PUSCH}(i,k)=P_{PUSCH}(i,k)-(P_{PUSCH}(i,k)-P_{PUSCH}(i,j)-P_{\Delta CC})\cdot\alpha$$

$$P_{PUSCH}(i,j)=P_{PUSCH}(i,j)+(P_{PUSCH}(i,k)-P_{PUSCH}(i,j)-P_{\Delta CC})\cdot\beta$$

Otherwise (that is, if $P_{PUSCH}(i,k)<P_{PUSCH}(i,j)$), $$P_{PUSCH}(i,j)=P_{PUSCH}(i,j)-(P_{PUSCH}(i,j)-P_{PUSCH}(i,k)-P_{\Delta CC})\cdot\alpha$$

$$P_{PUSCH}(i,k)=P_{PUSCH}(i,k)+(P_{PUSCH}(i,j)-P_{PUSCH}(i,k)-P_{\Delta CC})\cdot\beta$$

Given that α+β=1, where α and β may be determined according to one of the following examples. α and β may be determined equally for all CCs, such that α=β=½. Alternatively, scaling factors for all non-anchor carriers, also called secondary component carriers (SCCs), may be determined equally before considering the anchor carrier, also called primary CC (PCC) (meaning the CC that conveys PUCCH(s) or other agreed signaling). Alternatively, the values may be determined simultaneously, using different weights per CC, where weights may be (1) grant based, (2) pre-defined (configured or pre-configured), (3) based on CC type (anchor or non-anchor), or (4) based on maximum power per CC.

Alternatively, the values may be determined one CC at a time, wherein a CC's power may be reduced until the maximum CC power difference may no longer be exceeded. The CCs may be chosen in one or more of the following manners. As an example, order may be chosen by CC type (primary or secondary). For example, SCCs may be chosen first and then the PCC. Alternatively, all SCCs may be reduced equally. Each SCC may be weighted differently, and weight may, for example, be grant-based or pre-defined. Another example may be PCC is chosen first followed by SCCs. Moreover, a pre-defined order based on agreed to channel priorities or grant-based order may be used. Order may also be based on CC headroom, either in increasing or decreasing order. Order may be based on whether it is a first transmission or retransmission. For example, a CC that may be a first transmission that is chosen first. Another example may be first choosing a CC that is a Hybrid Automatic Repeat Request (HARQ) retransmission. If all CCs may be either first transmissions or retransmissions, another embodiment explained herein is used. This may raise the power of weaker CCs as well as reduce the power of stronger CCs which may in turn reduce power differences between CCs.

In another embodiment, maximum CC transmit power may be limited after limiting the power difference between CCs. For example, after taking the additional step for limiting the CC power difference as noted above, if the PUSCH power level on a CC is greater than $P_{EMAX}$ in equation (3), then a WTRU may perform one of following. The WTRU may drop in this particular subframe the transmission of the delay tolerant services and, if needed, scale back the power level of the corresponding CCs such that both the $P_{EMAX}$ and $P_{ACC}$ requirements may be respected. Preferably, the power scale back may be done such that the powers of the CCs carrying error tolerant services may be reduced first. Alternatively, the powers may be scaled back by a proportional rule (for example, by the same percentage).

Alternatively, a WTRU may, without dropping any service, scale back the power levels to respect both $P_{EMAX}$ and $P_{ACC}$ requirements such that the powers of the CCs carrying error tolerant services may be reduced first. In the case of a tie, power for delay tolerant services may be scaled back. A WTRU may also scale back the transmit power for each CC violating $P_{EMAX}$ limit just enough to respect both $P_{EMAX}$ and $P_{ACC}$ requirements.

Alternatively, a WTRU may reduce the power of any CC in violation of $P_{EMAX}$, accepting that the $P_{ACC}$ limit will be violated but $P_{EMAX}$ limit may not be violated. The power scale back may be done such that the powers of the CCs carrying error tolerant services may be reduced first. In case of a tie, the power for delay tolerant services may be scaled back. The transmit powers may also be scaled back by a proportional rule (for example, by the same percentage). Alternatively, the transmit power of the CCs may be adjusted such that the number of pairs of CCs violating the $P_{ACC}$ requirement may be minimized. Alternatively, the transmit power for each CC may be reduced by the same amount (for example, the same absolute value so that the $P_{EMAX}$ limit may not be violated).

Alternatively, the power may be left as already computed for all CCs, accepting that the $P_{EMAX}$ limit will be violated. Alternatively, a WTRU may select an intermediate power level for any CC in violation of $P_{EMAX}$, accepting that both $P_{EMAX}$ and $P_{ACC}$ may be violated.

Alternatively, or in addition to a WTRU performing any procedure above, it may report the events (for example, a violation of $P_{EMAX}$ and/or $P_{ACC}$ requirements) to an eNodeB. The eNodeB may then take the necessary steps to help ensure that the specified maximum CC power difference and/or $P_{EMAX}$ is not exceeded. The eNodeB may do this through closed loop power control ensuring that the TPC commands may be issued in a way that help a WTRU satisfy both $P_{EMAX}$ and $P_{ACC}$ requirements.

Alternatively, or in conjunction with closed loop power control, an eNodeB may use an AMC scheme and the adjustment to the UL grant allocation (amount of UL resources block allocated) to help a WTRU satisfy both $P_{EMAX}$ and $P_{ACC}$ requirements. The reporting may be done using a new medium access control (MAC) element or an extension to the LTE power headroom reporting mechanism to report the CC specific power head room values.

Again referring to the case of simultaneous PUSCH and PUCCH transmission, after taking the additional step for limiting the CC power difference as noted above, if the total power of PUSCH and PUCCH on a CC is greater than $P_{EMAX}$, that is, $P_{EMAX} < P_{PUSCH}(i,k) + P_{PUCCH}(i,k)$ for any CC k in subframe i, then a WTRU may reduce the PUSCH and/or PUCCH transmit power on the CC as follows. A WTRU may prioritize PUCCH over PUSCH. The PUSCHs power may be adjusted to meet the $P_{EMAX}$ requirements, the $P_{ACC}$ requirements, or both. Alternatively, any one of the $P_{ACC}$ requirements, the $P_{EMAX}$ requirements, or both may be violated as noted above. A WTRU may reduce the transmit power for a CC by the same amount such that the total power of the adjusted PUSCH/PUCCH power levels does not exceed $P_{EMAX}$.

Alternatively, a WTRU may reduce the PUSCH transmit power and/or PUCCH transmit power on a CC by a proportional factor where the proportional factor may be determined as either the same percentage reduction or by priority/QoS and/or required transmit power, so that the total power of the adjusted PUSCH/PUCCH power levels does not exceed $P_{EMAX}$.

In another embodiment, maximum PA transmit power may be limited after limiting the power difference between CCs. After taking the additional steps for limiting a CC power difference as noted above, if the sum of the PUSCH power levels on the CCs is greater than $P_{AMAX}$, that is $$P_{AMAX} < \sum_k P_{PUSCH}(i,k)$$

for CCs k in subframe i, then a WTRU may perform one of the following procedures. A WTRU may drop in this particular subframe drop the transmission of the delay tolerant services, and if needed scale back the power level of the corresponding CCs such that both $P_{AMAX}$ and $P_{ACC}$ requirements are respected. The power scale back may be done such that the powers of the CCs carrying error tolerant services may be reduced first. Alternatively, the powers may be scaled back by a proportional rule (e.g., by the same percentage).

A WTRU may, without dropping any service, scale back the power levels to meet both $P_{AMAX}$ and $P_{ACC}$ requirements such that the powers of the CCs carrying error tolerant services may be reduced first. In the case of a tie, a WTRU may scale back power for delay tolerant services. Alternatively, it may scale back the transmit power for each CC violating $P_{AMAX}$ limit just enough to meet both $P_{AMAX}$ and $P_{ACC}$ requirements.

Alternatively, a WTRU may reduce the power of any CC in violation of $P_{AMAX}$, accepting that the $P_{ACC}$ limit will be violated but $P_{AMAX}$ limit is not violated. Preferably the power scale back may be done such that the powers of the CCs carrying error tolerant services may be reduced first. In case of a tie, it may scale back power for delay tolerant services. Alternatively, the transmit powers may be scaled back by a proportional rule (for example, by the same percentage). Alternatively, a WTRU may adjust the transmit power of the CCs such that the number of pairs of CCs violating the $P_{ACC}$ requirement is minimized. Alternatively, it may reduce the transmit power for each CC by same amount (meaning the same absolute value) so that the $P_{AMAX}$ limit is not violated.

Alternatively, a WTRU may leave the power as already computed for all CCs, accepting that the limit will be violated. It may also select an intermediate power level for any CC in violation of $P_{AMAX}$, accepting that both $P_{AMAX}$ and $P_{ACC}$ may be violated.

Alternatively and in addition to a WTRU performing any of the procedures above, it may report the events (violation of $P_{AMAX}$ and/or $P_{ACC}$ requirements) to an eNodeB. The eNodeB may then take the necessary steps to help ensure that the specified maximum CC power difference and/or $P_{AMAX}$ is not exceeded. The eNodeB may do this through closed loop power control ensuring that the TPC commands may be issued in a way that help the WTRU respect both $P_{AMAX}$ and $P_{ACC}$ requirements. Alternatively, or in conjunction with closed loop power control, an eNodeB may also use an AMC scheme and the adjustment to the UL grant allocation (amount of UL resources block allocated) to help the WTRU meet both $P_{AMAX}$ and $P_{ACC}$ requirements. The reporting may be done using a new MAC control element or an extension to the LTE power headroom reporting mechanism to report CC specific power head room values.

For the case of simultaneous PUSCH and PUCCH, after taking the additional steps for limiting the CC power difference as noted above, if the total power of PUSCH(s) and PUCCH(s) on the CCs is greater than $P_{AMAX}$, that is, $$P_{AMAX} < \sum_k (P_{PUSCH}(i,k) + P_{PUCCH}(i,k))$$

for CCs k in subframe i then a WTRU may reduce the PUSCH and/or PUCCH transmit power on each CC as follows. It may prioritize PUCCH over PUSCH. A WTRU may adjust the PUSCH's power to meet $P_{AMAX}$ requirements, $P_{ACC}$ requirements, or both. Alternatively, $P_{ACC}$ requirements, $P_{AMAX}$ requirements, or both may be violated in the methods above.

Alternatively, a WTRU may reduce the transmit power for each CC by the same amount such that the total power of the adjusted PUSCH/PUCCH power levels does not exceed $P_{AMAX}$. Alternatively, it may reduce the PUSCH transmit power and/or PUCCH transmit power on each CC by a proportional factor where the proportional factor is determined as either the same percentage reduction or by priority/QoS and/or required transmit power, so that the $P_{AMAX}$ limit is not violated (for example, the sum of the PUSCH and PUCCH transmit power levels does not exceed $P_{AMAX}$).

In another embodiment, a WTRU sets a transmit power without consideration of a maximum CC power difference. The WTRU may rebalance per CC transmit power with a maximum power constraint. A total power per CC may be for each CC k in subframe i as follows:

$$P_{CC}(i,k) = P_{PUCCH}(i,k) + P_{PUSCH}(i,k). \quad \text{Equation (12)}$$

If $P_{CC}(i,k) > P_{EMAX}(k)$, a WTRU may then limit $P_{CC}(i,k)$ to $P_{EMAX}(k)$ by adjusting weighting factor $\beta(k)$ such that:

$$P_{CC}(i,k) = P_{PUCCH}(i,k) + \beta(k) * P_{PUSCH}(i,k) = P_{EMAX}(k). \quad \text{Equation (13)}$$

The power reduction may be applied only to PUSCH power, but if there are only PUCCHs, then power reduction may be applied to PUCCHs as well.

Alternatively, a WTRU may rebalance the sum of all CC powers with the maximum power constraint. Total data and control power for all CCs and a total transmit power may be represented as follows:

$$P_{data}(i,k) = \sum_k (P_{PUSCH}(i,k)); \quad \text{Equation (14)}$$

$$P_{control}(i,k) = \sum_k (P_{PUCCH}(i,k)); \text{ and} \quad \text{Equation (15)}$$

$$P_{Tx}(i) = P_{data}(i,k) + P_{control}(i,k). \quad \text{Equation (16)}$$

$P_{data}$ is an intermediate variable representing the power level of a data channel. $P_{control}$ is an intermediate variable representing the power level of a control channel.

If $P_{Tx}(i) > P_{AMAX}(k)$, a WTRU may limit $P_{Tx}(i)$ to $P_{AMAX}$ by adjusting setting variable $\beta_{Tx}$ such that:

$$P_{Tx}(i) = P_{control}(i,k) + \beta_{Tx} * P_{data}(i,k) = P_{AMAX}. \quad \text{Equation (17)}$$

The power reduction may be applied only to PUSCH power, but if there are only PUCCHs, then power reduction may be applied to PUCCHs in the same way. A WTRU may also use the procedure in equation (11) and then may autonomously limit CC power difference by applying equations (12)-(17).

In another embodiment, power imbalances may be handled based on the total transmission power. Assuming that the existing ACLR requirements for single carrier may be maintained for multiple CC operation, a total transmission power-based algorithm may be used to handle the maximum power difference between carriers. When the total transmission power does not exceed a WTRU's maximum power, inner and outer loop power control mechanisms may handle the imbalance. When total transmission power exceeds a WTRU's maximum power, power reduction algorithms described above may be used to handle the imbalance.

A WTRU may share its total power over multiple carriers during multiple carrier operation. There may be potential sources of nonlinearity in the front end, which may include varying power amplifiers, mixers, etc. Generally, the signal-to-noise ratio (SNR) of multiple CCs may be worse than that in single CC. This may be because multiple CCs share the total power and also modulate each other and contribute to ACLR. The ACLR may be increased as a particular hardware configuration is alternately driven by a single or multiple CC signal and by a single CC signal with the same total power. Therefore, when the maximum power difference in multiple CCs occurs, there may be a degradation of the SNR on the victim carrier due to spectral leakage from the aggressor carrier. To avoid this, the acceptable ACLR (similar to the existing ACLR requirements for single carrier) should be maintained for multiple CC operation.

An eNodeB may resolve the power imbalances by ensuring that the difference in UL transmit power on multiple CCs lies within a certain threshold for a given WTRU by using an existing power control mechanism, such as DL TPC commands. This threshold may be preconfigured or signaled to an eNodeB by the network.

An example of using this embodiment to maintain the closer UL PUSCH and/or PUCCH received power may be as follows. When the difference in UL PUSCH and/or PUCCH received power of multiple CCs is greater than the given threshold, An eNodeB may compare the estimated PUSCH and/or PUCCH SIR of a victim CC to its PUSCH and/or PUCCH SIR target plus the offset and generate TPC commands. The likely result may be an increase of the PUSCH and/or PUCCH power of the victim CC and a decrease of the power imbalance between multiple CCs. When the difference in PUSCH and/or PUCCH received power of multiple CCs is no more than the given threshold, two independent loop power control may be run without offsetting the PUSCH and/or PUCCH SIR targets.

As an example, let SIRTarget1 and SIRTarget2 represent the SIR targets configured for each CC. A single SIRTarget may be configured, in which case SIRTarget1=SIRTarget2. Let Rx1 and Rx2 represent the measured UL PUSCH and/or PUCCH received power for a CC1 and a CC2, respectively, by an eNodeB. Let MAX_pwr_DELTA represent the maximum desired difference between Rx1 and Rx2. Finally, let TARGET_OFFSET represent the offset used to adjust the SIRTarget1 or SIRTarget2 given by the higher layer.

In the following examples, the case of two component carriers is given where SIR1 represents the signal-to-interference ratio of the first component carrier and TPC1 represents the transmit power control command received by a WTRU for the first component carrier. Correspondingly, SIR2 represents the signal-to-interference ratio of the second component carrier and TPC2 represents the transmit power control command received by the WTRU for the second component carrier. However, the process may be expanded to a plurality of component carriers as desired.

A two independent inner loop power control algorithms for multiple CCs may take the following form:

```
If (Rx1 − Rx2 > MAX_pwr_DELTA)
    SIRTarget1_current = SIRTarget1
    SIRTarget2_current = SIRTarget2+ TARGET_OFFSET
    If (SIR1 < SIRTarget1_current)
        Then TPC1 is set to UP
    Else TPC1 is set to down
    If (SIR2 < SIRTarget2_current)
        Then TPC2 is set to UP
    Else TPC2 is set to down;
Else if (Rx2 − Rx1 > MAX_pwr_DELTA)
    SIRTarget1_current = SIRTarget1 + TARGET_OFFSET
    SIRTarget2_current = SIRTarget2
    If (SIR1 < SIRTarget1_current)
        Then TPC1 is set to UP
    Else TPC1 is set to down
    If (SIR2 < SIRTarget2_current)
        Then TPC2 is set to UP
    Else TPC2 is set to down;
Else
    SIRTarget1_current = SIRTarget1
    SIRTarget2_current = SIRTarget2
    If (SIR1 < SIRTarget1_current)
        Then TPC1 is set to UP
    Else TPC1 is set to down
    If (SIR2 < SIRTarget2_current)
        Then TPC2 is set to UP
    Else TPC2 is set to down.
```

This algorithm may ensure that the difference in PUSCH and/or PUCCH received power on the two CCs lies within a given threshold while meeting the SIRtarget qualities on both CCs. The algorithm may be modified to achieve the same goal by reducing the SIRtarget of the aggressor CC, which may not be favorable from a QoS perspective.

Alternatively, an example embodiment of a joint UL multiple CC inner loop power control algorithm may take the following form. Let SIR1 and SIR2 denote the measured SIR levels on CC1 and CC2 respectively. Let SIRTarget1 and SIRTarget2 represent the SIR targets configured for each CC. A single SIRTarget may be configured, in which case SIRTarget1=SIRTarget2. Let Rx1 and Rx2 represent the measured PUSCH and/or PUCCH received power for CC1 and CC2, respectively. Let StepSize represent the increase or decrease in power that may be applied by a WTRU following an UP or DOWN command received from an eNodeB. Let TPC1 and TPC2 represent the UP or DOWN TPC commands that an eNodeB generated for CC1 and CC2. TPC1 and TPC2 may be the output of the joint inner loop power control algorithm. Let MAX_pwr_DELTA represent the maximum desired difference between Rx1 and Rx2.

The jointly determined inner loop power control commands may then be derived as follows:

```
If (SIR1 < SIRTarget1) and (SIR2 < SIRTarget2)
    Then TPC1 is set to UP and TPC2 is set to UP;
Else If (SIR1 < SIRTarget1) and (SIR2 > SIRTarget2)
    If (Rx1 < Rx2),
        Then TPC1 is set to UP and TPC2 is set to DOWN
    Else (i.e. Rx1 > Rx2)
        If (Rx1 − Rx2 + 2*StepSize) < MAX_pwr_DELTA
            Then TPC1 is set to UP and TPC2 is set to DOWN
        Else
            TPC1 is set to UP and TPC2 is set to UP;
Else If (SIR1 > SIRTarget1) and (SIR2 < SIRTarget2)
    If (Rx1 > Rx2),
        Then TPC1 is set to DOWN and TPC2 is set to UP
    Else (i.e. Rx1 < Rx2)
        If (Rx2 − Rx1 + 2*StepSize) < MAX_pwr_DELTA
            Then TPC1 is set to DOWN and TPC2 is set to UP
        Else
            TPC1 is set to UP and TPC2 is set to UP;
Else If (SIR1 > SIRTarget1) and (SIR2 > SIRTarget2)
    Then TPC1 is set to DOWN and TPC2 is set to DOWN.
```

The algorithm described above prioritizes reaching the SIR-Target quality on each CC ahead of meeting the maximum difference in power per CC. The algorithm may be modified to reach the maximum carrier power difference more quickly, at the expense of not meeting the SIRTarget on one or both CCs.

Alternatively, an eNodeB may ensure that the difference in the total received power on each CC for a WTRU may be within a certain threshold. In another embodiment, an eNodeB may apply the power matching algorithm described above and may ensure that the difference in scheduling grants provided for each CC lies within a certain threshold. In another embodiment, an eNodeB may determine inner loop power control commands for PUSCH and/or PUCCH independently for each CC. This may be down, for example, by comparing the received SIR to the target SIR on each CC. An eNodeB may also determine scheduling grants jointly across the two CCs by ensuring that the difference in total received power from a WTRU on both CCs lies within a predetermined threshold, assuming scheduling grants may be fully utilized.

In any of the embodiments described above, the maximum power difference thresholds may be pre-configured (for example, pre-defined "hard values") or may be configured by the network through signaling to an eNodeB.

In another embodiment, a WTRU may autonomously limit the power difference taking into account channel priorities. It may limit power differences between CCs in a manner that adjusts the power of the channels (e.g., PUSCH and/or PUCCH) on the CCs based on the priorities of the CCs and/or the channels being carried by these CCs.

There may be a maximum transmit power difference allowed between CCs and/or between the PUCCH and the PUSCH. This may be a limit imposed by a standard, a configured value or values, for example signaled by an eNodeB to a WTRU. The limits may be defined such that they are not exceeded by a WTRU or such that the WTRU is permitted to limit the differences but is not required to. The allowed maximum power difference between PUCCH and PUSCH may be the same as, or different than, the allowed maximum power difference between CCs.

A rule may be defined such that a WTRU may increase power on one or more channels, for example PUCCH and/or PUSCH on the same or different CCs in order to avoid exceeding the maximum power difference between channels and/or CCs.

As an example, in a given subframe, a WTRU may increase power on one or more channels, for example PUCCH and/or PUSCH on the same or different CCs, in order to avoid exceeding the maximum power difference between channels and/or CCs. This may be performed after power has been computed for the channels to be transmitted based on the power control formulas for the channels and after scaling or other power reduction may have been performed to avoid exceeding maximum CC and/or maximum WTRU power limits.

Alternatively, a rule may be defined such that a WTRU may increase or decrease power on one or more channels, for example PUCCH and/or PUSCH on the same or different CCs in order to avoid exceeding the maximum power difference between channels and/or CCs. This includes the possibility that a WTRU may increase the power on one or more channels and decrease the power on one or more other channels.

As an example, in a given subframe, a WTRU may increase or decrease power on one or more channels, for example PUCCH and/or PUSCH on the same or different CCs in order to avoid exceeding the maximum power difference between channels and/or CCs. This may be performed after power has been computed for the channels to be transmitted based on the power control formulas for the channels and after scaling or other power reduction may have been performed, to avoid exceeding maximum CC and/or maximum WTRU power limits.

A WTRU may follow one or more of the following embodiments. The embodiments may be used independently or in any combination.

A WTRU may raise (or lower) the power on a channel the minimum amount necessary to avoid exceeding the maximum power difference between channels and/or CCs.

A WTRU may only raise the power on a channel such that the maximum CC power limit and the maximum WTRU power limits are not exceeded.

A WTRU may raise the power of the weakest (lowest power) CC that is causing the maximum power difference between CCs to be exceeded first.

A WTRU raising (or lowering) the power of a CC may mean the WTRU raising (or lowering), for example scaling, the power of a channel or channels being carried by that CC.

A WTRU may raise the power of the highest priority weak CC that is causing the maximum power difference between CCs to be exceeded first. Priority may be determined by the rules defined for power scaling, for example, from highest to lowest priority, PUCCH, PUSCH with uplink control information (UCI), PUSCH without UCI. As an example, if a WTRU has 3 CCs: primary component carrier (PCC) carrying PUSCH with UCI with power P1, a secondary component carrier 1 (SCC1) carrying PUSCH with power P1 and another secondary component carrier 2 (SCC2) carrying PUSCH with power P2, if P2>P1 and P2–P1 exceeds the maximum power difference between CCs, then the WTRU may raise (scale up) the power of the PUSCH on PCC first to avoid exceeding the limit between PCC and SCC2.

Once a WTRU has successfully raised or lowered the power of a CC to avoid exceeding the maximum power difference between that CC and another CC, a WTRU may raise or lower the power of another CC that is causing the maximum power difference between CCs to be exceeded When raising the power on a CC carrying both PUSCH and PUCCH to resolve exceeding the maximum power difference between CCs, a WTRU may scale the power on PUSCH and PUCCH equally.

If it is not possible to raise the power on a channel high enough to resolve exceeding the maximum power difference between two CCs without violating a CC maximum power limit or a WTRU maximum power limit, a WTRU may drop the lower priority channel or CC.

A WTRU may attempt to reduce the transmit power difference between CCs that are exceeding the maximum power difference between CCs by addressing the transmit power difference between one pair of CCs at a time. A WTRU may begin with the pair that has the largest power difference and/or it may begin with a pair that includes the CC carrying the highest priority channel(s).

When raising the power of a CC (for example CC1) to resolve exceeding the maximum power difference between CCs, if scaling is required such that the CC1 power will exceed that of another CC (for example CC2), a WTRU may then scale CC2 such that the powers of those CCs (e.g., CC1 and CC2) remain equal as the power is raised until the maximum power difference between CCs is no longer exceeded or a maximum CC or WTRU power limit is reached which may result in the WTRU dropping one or more CCs or channels.

A WTRU may decrease the power of a low priority strong CC that is causing the maximum power difference between CCs to be exceeded. Priority may be determined by the rules defined for power scaling, for example, from highest to lowest priority, PUCCH, PUSCH with UCI, PUSCH without UCI. As an example, if a WTRU has 2 CCs: PCC carrying PUSCH with UCI with power P1 and an SCC carrying PUSCH with power P2, if P2>P1 and P2–P1 exceeds the maximum power difference between CCs, then the WTRU may reduce the power on the PUSCH on the SCC to avoid exceeding the limit between PCC and SCC.

To resolve a maximum power difference between PUCCH and PUSCH in the case where the PUSCH power is higher than the PUCCH power, a WTRU may increase the PUCCH power as long as the maximum CC and WTRU power limits are not exceeded. In the case that the maximum CC and/or WTRU power limit(s) may be exceeded, a WTRU may instead, or in addition, decrease PUSCH power.

To resolve a maximum power difference between PUCCH and PUSCH in the case where the PUSCH power is higher than the PUCCH power, a WTRU may decrease PUSCH power.

An example WTRU procedure in accordance with some of the embodiments may be given as follows. First (referred to as step 1), a WTRU determines per channel transmit powers based on the agreed power control formulas and, if applicable, the rules relating to avoiding exceeding per-CC maximum transmit power and maximum WTRU transmit power limits.

Second (referred to as step 2), for each pair of channels or each pair of CCs, e.g., PUCCH and PUSCH in PCC, PCC and a SCC, or one SCC and another SCC, from highest to lowest transmit power difference the following may be performed. If allowed maximum delta power (between CCs or channels) is exceeded, a WTRU may increase the transmit power of the weaker CC to resolve exceeding a maximum power difference between CCs, or a WTRU may increase the transmit power of the weaker channel to resolve exceeding a maximum power difference between channels. For the case of PUCCH and PUSCH in a CC (e.g., PCC), a WTRU may increase both channels equally to resolve a maximum power difference between CCs. A WTRU may increase (e.g., scale) the power until maximum delta power is no longer exceeded (in this case, it may move on to the next pair if there is one or the procedure is done) or until maximum CC power for any of the increasing channels, or maximum WTRU power, is reached, in which case, the WTRU may continue with Method A or Method B.

For Method A: If there is a priority difference between the CCs (or channels), a WTRU may drop the lower priority CC (or channel) of the pair. If there is no priority difference between the channels, a WTRU may drop the weaker of the pair. The WTRU may move on to the next pair, if there is one. Before moving on to the next pair, if the CC (or channel) remaining is the one for which power was increased, the WTRU may return its power to its original value from step 1.

For Method B, if the stronger CC or channel is the same or lower priority than the weaker one, a WTRU may reduce the power of stronger CC or channel until maximum delta power is no longer exceeded. If the stronger CC or channel is higher priority than the weaker one, a WTRU may drop the weaker one.

However, if a channel is dropped, rather than continue on to the next pair, the algorithm may be restarted at step 1 or 2 for all remaining channels.

Described below are example methods for signaling of maximum CC power differences and using the signaled values.

A WTRU may signal its maximum CC power difference to an eNodeB. Given that an eNodeB may know the maximum CC power difference for a WTRU's CCs or PA(s), an eNodeB may take this into account in its power control procedures for that WTRU and/or when determining power control parameters for that WTRU and/or when allocating resources, such as scheduling for the WTRU's transmission.

An eNodeB may ensure that the signaled maximum CC power difference is not exceeded. For example, an eNodeB has knowledge of all the PC parameters which it sends to a WTRU (including, $P_{o\_PUSCH}$, $\alpha(j)$, $M^{PUSCH}(i)$, $\Delta_{TF}(i)$, and $f(i)$) and it may estimate a pathloss for each UL CC from power headroom reporting from a WTRU. In that case, an eNodeB may ensure the maximum power difference limitation between CCs by controlling the UL grant per CC and/or Transmitter Power Control (TPC) command per CC.

Described below are example methods for specification of maximum CC power difference and for using the specified values.

A maximum CC power difference that a WTRU may support may be specified or implied. For example, one specified test scenario may include two CCs with a given power difference, and that power difference is the largest power difference amongst all test scenarios, then this power difference may be the maximum CC power difference that a WTRU should support. Alternatively, a required maximum CC power difference may be explicitly specified. If an eNodeB provides $P_{EMAX}$ per CC for a WTRU, where $P_{EMAX}$), may be different for each CC, then the maximum transmit power difference among the values of $P_{EMAX}$ may be less than or equal to $P_{ACC}$.

Power control at an eNodeB may ensure that the specified maximum CC power difference is not exceeded. An eNodeB may do this through closed loop power control ensuring that the TPC commands may be issued in a way that ensures that a CC power difference is not exceeded. Alternatively, or in conjunction with closed loop power control, an eNodeB may use an adaptive modulation and coding (AMC) scheme and the adjustment to the UL grant allocation (amount of UL resources block allocated) to maintain the maximum CC power difference below its limit.

Described below are example methods for transmit power computation processing in a WTRU.

Any of the transmit power computations, such as the computation of the transmit power without consideration to $P_{ACC}$, the adjustment to take into account the $P_{ACC}$ requirements, the power scale back to take into account the $P_{EMAX}$ requirements, the $P_{AMAX}$ requirements, or any combination of these, may be done in the MAC, PHY, or both the MAC/PHY sublayers/layers. The final transmit power computations may be done by a WTRU with all necessary adjustments before the PHY layer processing, such as coding, modulation, and antenna/resource mapping.

The services/QoS configuration information may be made available to MAC/PHY by a WTRU's higher layers such as the RRC. Transporting multiple transport channels, such as several PUSCHs in the UL and physical downlink shared channels (PDSCHs) in the downlink (DL), may also be used in LTE-A. The mapping between services/QoS attributes to these transport channels to the CCs may be done by a WTRU such that the various constraints on the transmit power levels are respected.

MAC or PHY or both layers in collaboration with each other and possibly with the support from the radio link control (RLC) layer may continuously estimate the transmit power for various mappings of services data flows to CCs and select the mapping such that on a long term basis the buffer status report (BSR) eventually reported to an eNodeB does not lead to allocation of resource grants and MCS that causes the transmit power constraints, such as $P_{EMAX}, P_{AMAX}$, or $P_{ACC}$, to be violated.

A WTRU may report its BSR on a CC basis to an eNodeB so that in the case where there is no feasible solutions despite the attempt to balance the buffer occupancies between CCs taking into account one or more of $P_{EMAX}, P_{AMAX}$, or $P_{ACC}$ constraints, a WTRU may inform an eNodeB as noted above providing it input such as CC specific headroom and/or PA specific headroom and/or maximum CC power differences. Reconfiguration of CC to PA mapping may be performed to avoid exceeding any power limitation.

Described below are example methods for network adjustment of target SIRs at an eNodeB.

The network may configure an eNodeB with different PUSCH and/or PUCCH SIR targets when a WTRU is operating with multiple CCs. An eNodeB may use these values when the SCC is activated or configured. An eNodeB may then revert to the single-CC SIR targets when the non-anchor SCC is de-activated or not configured. The different SIR targets may be signaled by the network to an eNodeB by means of SIR offsets which are applied to the SIR targets at an eNodeB for a given WTRU when its non-anchor CC(s) are activated.

Described below are example methods for detection and reporting of power imbalances.

A WTRU may detect a power imbalance condition and may signal it to the network. To declare that a power imbalance condition exists, a WTRU may determine the power difference between the total power transmitted on one CC and the total power transmitted on another CC and compare that value to a threshold value. Alternatively, a WTRU may compare the power difference between the total power transmitted on one CC and the PUCCH power transmitted on the other CC to a threshold value and vice versa. A WTRU may carry out these operations every subframe. If any of the power differences are above the threshold, a WTRU may notify the condition to the network. A WTRU may also count the number of successive subframes for which the power imbalance condition is detected. The count may be reset on a subframe where the power imbalance condition is not detected. When the count reaches a certain value, a WTRU may notify the power imbalance condition to the network.

The notification may be sent via a new field in the MAC/PHY as it terminates at an eNodeB. Alternatively, a WTRU may send an RRC message to the network indicating the conditions. This RRC message may be a measurement report. As an example, a WTRU may send the information via a MAC control element (CE). In such a case, detection of the power imbalance situation may act as a trigger for sending that MAC CE. The information may be carried, for example, in unused bits in an existing MAC CE. Alternatively, a new field may be introduced in an existing MAC CE or a new MAC CE may be introduced.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of transmit power control in a wireless transmit/receive unit (WTRU), capable of simultaneous transmission via multiple uplink (UL) component carriers (CCs), the method comprising:
   comparing by the WTRU a transmit power of a first UL CC to a first UL CC-specific maximum transmit power, wherein the first UL CC has a first UL CC priority and the first UL CC carries a first channel having a first channel priority;
   comparing by the WTRU a transmit power of a second UL CC to a second UL CC-specific maximum transmit power, wherein the second UL CC has a second UL CC priority and the second UL CC carries a second channel having a second channel priority;
   comparing by the WTRU a transmit power difference between the first UL CC, and the second UL CC to a maximum CC transmit power difference;
   raising or lowering by the WTRU a transmit power of the first UL CC or the second UL CC to keep the transmit power difference below the maximum CC transmit power difference, wherein the raising or lowering is based on at least one channel priority of a respective at least one channel transmitted over at least one of the first UL CC and the second UL CC, and further wherein the raising or lowering keeps the transmit power of the first UL CC below the first UL CC-specific maximum transmit power and keeps the transmit power of the second UL CC below the second UL CC-specific maximum transmit power, wherein the first UL CC-specific maximum transmit power is different than the second UL CC-specific maximum transmit power; and
   simultaneously transmitting the first channel via the first UL CC and the second channel via the second UL CC.

2. The method of claim 1 further comprising raising by the WTRU a transmit power of the first UL CC on a condition that the first channel is a high priority channel.

3. The method of claim 2 wherein the first channel is a physical uplink control channel (PUCCH), wherein the second channel is a physical uplink shared channel (PUSCH) with uplink control information (UCI), and the PUSCH with UCI is a next highest priority channel, and wherein a PUSCH without UCI is a channel with lower priority than the PUCCH and the PUSCH with UCI.

4. The method of claim 1 further comprising carrying both a physical uplink control channel (PUCCH) and a physical uplink shared channel (PUSCH) on the first UL CC and raising the transmit power of the first UL CC such that the transmit power difference between the first UL CC and the second UL CC is below the maximum CC transmit power difference.

5. The method of claim 1 further comprising dropping the second UL CC if the transmit power of the second UL CC cannot be raised such the transmit power difference between the first UL CC and the second UL CC is below the maximum CC transmit power difference without exceeding the first UL CC-specific maximum transmit power and the second UL CC-specific maximum transmit power.

6. The method of claim 1 further comprising:
   providing by the WTRU a plurality of UL CCs, each UL CC having one or more physical uplink control channels (PUCCHs) and physical uplink shared channels (PUSCHs); and
   reducing by the WTRU a transmit power difference between pairs of UL CCs of the plurality of UL CCs exceeding the maximum CC transmit power difference, based on priorities of the UL CCs and largest transmit power differences between the UL CCs of the pairs of UL CCs.

7. The method of claim 1 further comprising decreasing by the WTRU the transmit power of the second UL CC if the second UL CC is a low priority UL CC and the transmit power of the second UL CC is greater than the transmit power of the first UL CC on a condition that the transmit power difference between the first UL CC and the second UL CC is greater than the maximum CC transmit power difference.

8. The method of claim 1 further comprising increasing by the WTRU a physical uplink control channel (PUCCH) transmit power up to a maximum channel transmit power to resolve a maximum channel transmit power difference between the PUCCH transmit power and a physical uplink shared channel (PUSCH) transmit power, if the PUSCH transmit power is higher than the PUCCH transmit power.

9. The method of claim 1 further comprising decreasing by the WTRU the transmit power of the first UL CC, but not the transmit power of the second UL CC, to keep the transmit power of the first UL CC below the first UL CC-specific maximum transmit power.

10. A wireless transmit/receive unit (WTRU) capable of simultaneous transmission via multiple uplink (UL) component carriers (CCs), the WTRU comprising:
   circuitry configured to compare a transmit power of a first UL CC to a first UL CC-specific maximum transmit power, wherein the first UL CC has a first UL CC priority and the first UL CC carries a first channel having a first channel priority;
   circuitry configured to compare a transmit power of a second UL CC to a second UL CC-specific maximum transmit power, wherein the second UL CC has a second UL CC priority and the second UL CC carries a second channel having a second channel priority;
   circuitry configured to compare a transmit power difference between the first UL CC, and the second UL CC to a maximum CC transmit power difference; and
   circuitry configured to raise or lower a transmit power of the first UL CC or the second UL CC to keep the transmit power difference below the maximum CC transmit power difference, wherein the raising or lowering is based on at least one channel priority of a respective at least one channel transmitted over at least one of the first UL CC and the second UL CC, and further wherein the raising or lowering keeps the transmit power of the first UL CC below the first UL CC-specific maximum transmit power and keeps the transmit power of the second UL CC below the second UL CC-specific maximum transmit power, wherein the first UL CC-specific maximum transmit power is different than the second UL CC-specific maximum transmit power; and circuitry configured to simultaneously transmit the first channel via the first UL CC and transmit the second channel via the second UL CC.

11. The WTRU of claim 10 further comprising circuitry configured to raise the transmit power of the first UL CC on a condition that the first channel is a high priority channel.

12. The WTRU of claim 11 wherein the first channel is a physical uplink control channel (PUCCH), wherein the second channel is a physical uplink shared channel (PUSCH) with uplink control information (UCI), and the PUSCH with UCI is a next highest priority channel, and wherein a PUSCH without UCI is a channel with lower priority than the PUCCH and the PUSCH with UCI.

13. The WTRU of claim 10 further comprising circuitry configured to carry both a physical uplink control channel (PUCCH) and a physical uplink shared channel (PUSCH) on the first UL CC and raise the transmit power of the first UL CC such that the transmit power difference between the first UL CC and the second UL CC is below the maximum CC transmit power difference.

14. The WTRU of claim 10 further comprising circuitry configured to drop the second UL CC if the transmit power of the second UL CC cannot be raised such the transmit power difference between the first UL CC and the second UL CC is below the maximum CC transmit power difference without exceeding the first UL CC-specific maximum transmit power and the second UL CC-specific maximum transmit power.

15. The WTRU of claim 10 further comprising:

circuitry configured to provide a plurality of UL CCs, wherein each UL CC has one or more physical uplink control channels (PUCCHs) and physical uplink shared channels (PUSCHs); and circuitry configured to reduce a transmit power difference between pairs of UL CCs of the plurality of UL CCs exceeding the maximum CC transmit power difference, based on priorities of the UL CCs and largest transmit power differences between the UL CCs of the pairs of UL CCs.

16. The WTRU of claim 10 further comprising circuitry configured to decrease the transmit power of the second UL CC if the second UL CC is a low priority UL CC and the transmit power of the second UL CC is greater than the transmit power of the first UL CC on a condition that the transmit power difference between the first UL CC and the second UL CC is greater than the maximum CC transmit power difference.

17. The WTRU of claim 10 further comprising circuitry configured to a physical uplink control channel (PUCCH) transmit power up to a maximum channel transmit power to resolve a maximum channel transmit power difference between the PUCCH transmit power and a physical uplink shared channel (PUSCH) transmit power, if the PUSCH transmit power is higher than the PUCCH transmit power.

18. The WTRU of claim 10 further comprising circuitry configured to decrease the transmit power of the first UL CC, but not the transmit power of the second UL CC, to keep the transmit power of the first UL CC below the first UL CC-specific maximum transmit power.

* * * * *